US012592112B2

(12) United States Patent
McLachlan et al.

(10) Patent No.: US 12,592,112 B2
(45) **Date of Patent: *Mar. 31, 2026**

(54) COIN MAILER AND DISPLAY DEVICE

(71) Applicant: Antsy Labs LLC, Dacono, CO (US)

(72) Inventors: Matthew McLachlan, Dacono, CO (US); Mark McLachlan, Frederick, CO (US)

(73) Assignee: Antsy Labs LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/673,762

(22) Filed: May 24, 2024

(65) Prior Publication Data

US 2024/0395095 A1 Nov. 28, 2024

Related U.S. Application Data

(63) Continuation of application No. 17/511,425, filed on Oct. 26, 2021, now Pat. No. 11,995,941.

(Continued)

(51) Int. Cl.
*A47G 1/12* (2006.01)
*B65D 27/22* (2006.01)

(Continued)

(52) U.S. Cl.
CPC ............ *G07D 9/002* (2013.01); *B65D 27/22* (2013.01); *B65D 27/34* (2013.01); *A47G 1/12* (2013.01)

(58) Field of Classification Search
CPC .......... A47G 1/12; A47G 1/141; A47G 1/143; B65D 27/22; B65D 27/34; B65D 27/00;

(Continued)

(56) References Cited

U.S. PATENT DOCUMENTS 281,892 A * 7/1883 Leonard ................ B65D 27/00 229/84
359,955 A * 3/1887 Bellis ..................... B65D 27/00 229/92.9

(Continued)

OTHER PUBLICATIONS

Gold Plated Medallion Holder—Screw Top 24" Necklace | Recoveryshop pp. 1-6 2016 https://www.recoveryshop.com/Gold-Plated-Necklace-Chain-Medallion-Holder-p/mh01.htm (Year: 2016).

(Continued)

*Primary Examiner* — Gideon R Weinerth
(74) *Attorney, Agent, or Firm* — Polsinelli PC

(57) ABSTRACT

A mailer and display device for shipping and displaying coins or tokens includes a first panel having a front face, a back face, and one or more pockets extending inward from the front face that is sized and shaped to closely receive a coin or token. The device also includes a second panel foldably coupled to an upper edge of the first panel and a third panel foldably coupled to a lower edge of the first panel. The device is positionable into a first mailer configuration with the second and third panels folded over the first panel to form a substantially rectangular shape for shipping, and into a second display configuration with the second and third panels folded behind the first panel to form a hollow triangular shape for display, with the third panel forming a base and the front face of the first panel facing upwardly and outwardly.

17 Claims, 8 Drawing Sheets

Related U.S. Application Data

(60) Provisional application No. 63/105,730, filed on Oct. 26, 2020.

(51) Int. Cl.
*B65D 27/34* (2006.01)
*G07D 9/00* (2006.01)

(58) Field of Classification Search
CPC ........ B65D 27/04; G07D 9/002; G07D 9/004; G07D 9/00; G09F 5/042; A45C 11/18; B42F 5/00; B42F 5/02
USPC ............... 206/0.8; 229/92.9; 40/661.08, 323; D19/3; D99/34
See application file for complete search history.

(56) References Cited

U.S. PATENT DOCUMENTS 429,752 A * 6/1890 Camp .................... B65D 27/00 493/379
464,728 A 12/1891 Evans
618,497 A * 1/1899 Crabb .................... B65D 27/00 229/92.9
627,255 A * 6/1899 Duden .................. B65D 27/00 229/92.7
635,045 A * 10/1899 Henry .................... B65D 27/00 229/92.9
636,614 A * 11/1899 Bach ...................... B65D 27/00 229/92.9
752,010 A * 2/1904 Stempel ................. B65D 27/00 229/92.9
1,059,520 A 4/1913 Blomstrom
D45,355 S 3/1914 Saart
D47,376 S 5/1915 Depollier
1,138,381 A * 5/1915 Hart ....................... B65D 27/00 229/92.9
1,168,592 A * 1/1916 Bedinger ............... B42D 15/08 229/92.8
1,213,748 A * 1/1917 Cobel .................... B65D 27/00 229/92.9
1,235,194 A * 7/1917 Evans .................... B65D 27/00 229/92.9
1,419,065 A 6/1922 Lichter
1,482,433 A * 2/1924 Hoffman ................... B42F 5/02 229/92.9
1,632,185 A * 6/1927 Jenner .................. B42D 15/045 229/92.8
1,683,545 A 9/1928 Harris
1,719,962 A * 7/1929 Beistle .................... G09F 5/042 206/0.8
1,827,888 A * 10/1931 Greer ....................... A45C 1/00 232/5
1,884,235 A * 10/1932 Reinhold ................. A47G 1/12 229/92.1
2,037,504 A * 4/1936 Drake .................... G07D 9/004 229/92.9
D106,976 S 11/1937 Hokerk
2,110,429 A * 3/1938 Sunderhauf ............. A47F 5/112 248/459
2,219,492 A * 10/1940 Prichap .................. B65D 75/02 229/92.8
2,311,742 A * 2/1943 Eaton ................... B42D 15/045 229/92.9
D137,030 S 1/1944 Rubel
2,428,498 A * 10/1947 Mcwilliams ........... G07D 9/004 229/92.9
D150,738 S 8/1948 Strub
D151,939 S 11/1948 Reinstein
2,457,998 A * 1/1949 Winter ..................... A45C 1/02 206/0.82
2,459,292 A * 1/1949 Sherbondy ............. G07D 9/004 229/92.9
2,473,226 A 6/1949 Sheldon
D159,403 S 7/1950 Bardach
2,589,632 A * 3/1952 Scott ...................... B42D 15/08 229/92.9
D168,562 S 1/1953 Katz
2,672,977 A 3/1954 Seitz
2,675,171 A * 4/1954 Long ...................... B65D 27/00 229/92.9
2,827,166 A 3/1958 Evans, III
2,828,065 A 3/1958 Heywood
2,860,774 A * 11/1958 Ball ......................... B42D 1/08 229/92.9
2,874,828 A * 2/1959 Neugebauer .............. A47F 7/02 206/769
2,878,988 A 3/1959 Kryeske
3,044,606 A * 7/1962 Frosh ........................ B42F 5/00 206/815
3,112,861 A 12/1963 Benson
3,174,244 A * 3/1965 Walton ................. B42D 15/042 40/124.15
3,178,014 A 4/1965 Goldwasser
3,187,988 A * 6/1965 Gelier .................... B65D 27/02 229/92.9
3,193,090 A 7/1965 Hudgeons, Sr. et al.
3,217,866 A 11/1965 Phelps
3,245,523 A * 4/1966 White ...................... A47G 1/12 206/0.83
3,348,763 A 10/1967 Weston
3,371,851 A * 3/1968 Silene .................... B65D 27/00 229/92.9
3,405,864 A * 10/1968 Sloat ...................... B65D 27/02 53/140
3,624,832 A * 11/1971 Dunn ....................... A47G 1/12 206/0.83
D224,913 S 10/1972 Maroni
3,747,171 A 7/1973 Montague
3,913,732 A 10/1975 Peterson
3,957,157 A 5/1976 Therrien
D243,318 S 2/1977 Kurihara
4,043,477 A 8/1977 Deese
D252,775 S 8/1979 Stoffel
D264,058 S 4/1982 Gordan
4,429,787 A * 2/1984 Morse ...................... A45C 1/00 229/72
D284,803 S * 7/1986 Povitz ............................ D99/34
4,780,975 A * 11/1988 Friedman ............... A47G 1/141 40/733
4,807,806 A * 2/1989 Neiman ............... B42D 15/045 206/466
D332,684 S 1/1993 Melamed
D335,263 S 5/1993 Willis
D342,461 S 12/1993 Fahmy
D351,558 S 10/1994 Moon
5,439,101 A * 8/1995 Brink ..................... B65D 81/36 206/45.24
D372,878 S 8/1996 Finnegan
5,588,310 A 12/1996 Lal
5,988,365 A 11/1999 McAdams
D430,381 S 8/2000 Ellis et al.
6,128,840 A 10/2000 Boisvert
6,205,693 B1 3/2001 Pliler et al.
D455,245 S 4/2002 Bakker
D485,045 S 1/2004 Davis, Jr.
D503,025 S 3/2005 Taylor
6,969,091 B2 11/2005 Hilicki et al.
D519,396 S 4/2006 Migliorati
D555,531 S 11/2007 Wilson
D566,580 S 4/2008 Giorgio
D570,075 S 5/2008 Wood et al.
D580,810 S 11/2008 Reilly
D590,289 S 4/2009 Karpman
D591,925 S 5/2009 Roesch, Jr.
D603,276 S 11/2009 Herzog
7,837,031 B2 11/2010 Counts
D632,202 S 2/2011 Rodarmel
D639,691 S 6/2011 James
D640,948 S 7/2011 Ouigley
D684,084 S 6/2013 Bulgari

(56) References Cited

U.S. PATENT DOCUMENTS

| | | | | |
|---|---|---|---|---|
| D687,284 | S | | 8/2013 | Liu |
| D687,736 | S | | 8/2013 | Wycoff |
| D688,968 | S | | 9/2013 | Guerrero, II |
| D695,643 | S | | 12/2013 | Wolff |
| D698,689 | S | | 2/2014 | Boyd |
| D699,143 | S | | 2/2014 | Xu |
| D709,874 | S | | 7/2014 | Aumiller |
| D711,762 | S | | 8/2014 | Murphy |
| D711,872 | S | | 8/2014 | Aumiller |
| D712,773 | S | | 9/2014 | Mounce |
| D718,170 | S | | 11/2014 | Aumiller |
| D726,571 | S | | 4/2015 | Kovach |
| D734,143 | S | | 7/2015 | Mayer et al. |
| 9,227,775 | B2 | | 1/2016 | Boyer |
| D758,907 | S | | 6/2016 | Kaiser |
| D761,515 | S | | 7/2016 | Johnson |
| D769,765 | S | | 10/2016 | Tao |
| D779,193 | S | | 2/2017 | Jusino |
| D779,357 | S | | 2/2017 | Aumiller |
| D781,852 | S | | 3/2017 | Yu |
| D782,475 | S | | 3/2017 | Yu |
| D784,177 | S | | 4/2017 | Kaiser |
| D794,491 | S | | 8/2017 | Shanderson |
| 9,805,535 | B2 | | 10/2017 | Johnson |
| D807,670 | S | | 1/2018 | Dawson, Jr. |
| D810,603 | S | | 2/2018 | Davis |
| D821,248 | S | | 6/2018 | Naqvi |
| 10,081,485 | B2 | * | 9/2018 | Cernokus ............ B65D 5/5035 |
| D837,479 | S | | 1/2019 | Finn |
| D872,613 | S | | 1/2020 | Bidstrup |
| D872,619 | S | | 1/2020 | Tersch |
| D875,555 | S | | 2/2020 | Komulainen |
| D882,991 | S | | 5/2020 | Dawson, Jr. |
| D942,299 | S | | 2/2022 | Abdourahim |
| D952,506 | S | | 5/2022 | Sivriere |
| D962,809 | S | | 9/2022 | Wuest |
| D967,893 | S | * | 10/2022 | McLachlan ...................... D19/3 |
| 2004/0010953 | A1 | * | 1/2004 | Chimenti ................. G09F 3/20 40/323 |
| 2004/0031700 | A1 | | 2/2004 | Hanshaw |
| 2005/0011772 | A1 | * | 1/2005 | Eichenbaum ........... A45C 1/06 206/0.8 |
| 2006/0060274 | A1 | * | 3/2006 | Duffy ....................... A45C 1/06 150/136 |
| 2016/0133080 | A1 | * | 5/2016 | Johnson ................ G07D 9/002 705/26.8 |
| 2022/0130198 | A1 | * | 4/2022 | McLachlan ........... B65D 27/22 |

OTHER PUBLICATIONS

IRLA Necklace (Minor) p. 1 2020 https://www.antsylabs.com/products/irla-necklace-minor?pr_prod_strat=copurchase&pr_rec_id=30cd0bb11&pr_rec_pid=6079126077618&pr_ref_pid=6079135580338&pr_seq=uniform (Year: 2022) (Year: 2020).

* cited by examiner

COIN MAILER AND DISPLAY DEVICE

CROSS-REFERENCE TO RELATED APPLICATIONS

This application is a continuation of U.S. application Ser. No. 17/511,425, filed Oct. 26, 2021, which application claims the benefit of U.S. Provisional Patent Application No. 63/105,730, filed Oct. 26, 2020. All the above-referenced applications are incorporated by reference in their entirety herein and for all purposes.

FIELD

The present disclosure relates generally to a combination mailer package and display device for coins and tokens.

SUMMARY

Briefly described, one embodiment of the present disclosure comprises a coin mailer and display device for shipping and displaying coins or tokens. The coin mailer and display device generally includes a first panel having a front face, a back face, and one or more pockets extending inward from the front face that is sized and shaped to closely receive a coin or token. The device also includes a second panel foldably coupled to an upper edge of the first panel and a third panel foldably coupled to a lower edge of the first panel. The coin mailer and display device is configurable into a first mailer configuration with the second and third panels folded over the first panel to form a substantially rectangular shape for shipping, and subsequently reconfigured into a second display configuration with the second and third panels folded behind the first panel to form a hollow or tubular triangular shape for display, with the third panel forming a base and the front face of the first panel facing upwardly and outwardly.

Figure 1:
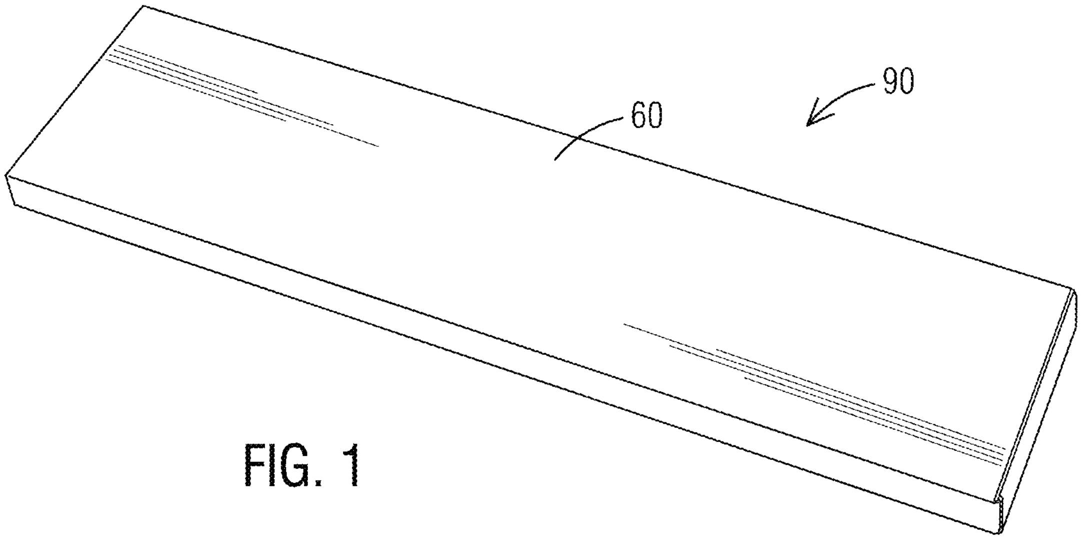
FIG. 1 is a perspective view of a coin mailer and display device having a tri-fold body in a first mailer configuration received within an outer sleeve, in accordance with a representative embodiment of the present disclosure.
Figure 2:
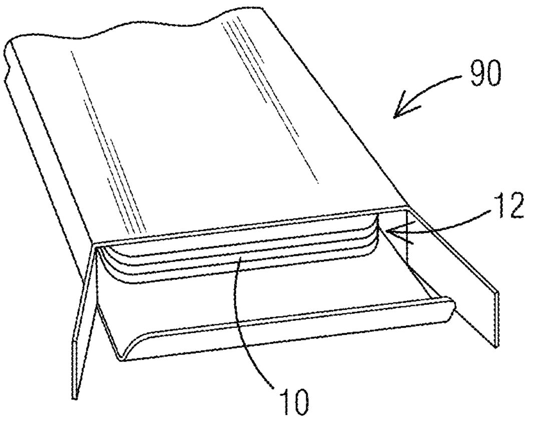
FIG. 2 is another perspective view of the coin mailer and display device of FIG. 1, with one end of the outer sleeve being opened to show the tri-fold body received within the outer sleeve.

Those skilled in the art will appreciate and understand that the various features and structures or elements of the drawings described above, together with their relative relationships, interconnections, and functions, can be interpreted as being drawn to scale. Nevertheless, it is also understood that the various embodiments of the present disclosure disclosed and claimed herein are not limited to the precise structures and interrelationships of the features or elements shown in the drawing figures, and that the dimensions, relative positions, and interconnections between the features or elements shown in the drawing figures may also be expanded, reduced, re-shaped, or otherwise revised or altered as needed to more clearly illustrate the various embodiments of the present disclosure depicted therein or to perform the functions described below.

DETAILED DESCRIPTION

The following description, in conjunction with the accompanying drawings, is provided as an enabling teaching of exemplary embodiments of a combination coin mailer and display device that is useful for mailing and/or displaying coins and tokens, such as achievement or challenge coins and tokens used in a variety of games or by a wide variety of organizations. The disclosure further includes one or more methods for converting the device from a mailer configuration to a display configuration. As described below, the system and methods can provide several significant advantages and benefits over other systems and methods for mailing and displaying coins and tokens currently available in the art. However, the recited advantages are not meant to be limiting in any way, as one skilled in the art will appreciate that other advantages may also be realized upon practicing the present disclosure. It will be appreciated, moreover, that other applications for the coin mailer and display device are also possible and considered to fall within the scope of the present disclosure.

Furthermore, those skilled in the relevant art will recognize that changes can be made to the described embodiments while still obtaining the beneficial results. It will also be apparent that some of the advantages and benefits of the described embodiments can be obtained by selecting some of the features of the embodiments without utilizing other features, and that features from one embodiment may be combined with features from other embodiments in any appropriate combination. For example, any individual or collective features of method embodiments may be applied to apparatus, product or system embodiments, and vice versa. Accordingly, those who work in the art will recognize that many modifications and adaptations to the embodiments described are possible and may even be desirable in certain circumstances and are a part of the disclosure. Thus, the present disclosure is provided as an illustration of the principles of the embodiments and not in limitation thereof since the scope of the invention is to be defined by the claims.

Referring now in more detail to the drawing figures, FIGS. 1-19 illustrate one representative embodiment of a combination coin mailer and display device 10. As shown in FIGS. 1-5, the coin mailer and display device 10 can comprise a tri-fold body that can be mailed or shipped in a folded state, or first mailer configuration 12, within an outer sleeve 60 to better secure and protect the coins or tokens during shipping. In one aspect both the protective outer sleeve 60 and the inner mailer 12 can be made of paper or of a paper-based material. Nevertheless, it is contemplated that one or both outer sleeve 60 and inner mailer 12 can be made of other materials or combinations of materials, including but not limited to wood, fabric, metal, Styrofoam™, or polymer-based materials such as plastic, and the like. The outer sleeve 60 may also be disposable or recyclable upon the removal of the inner mailer 12 therefrom.

Figure 3:
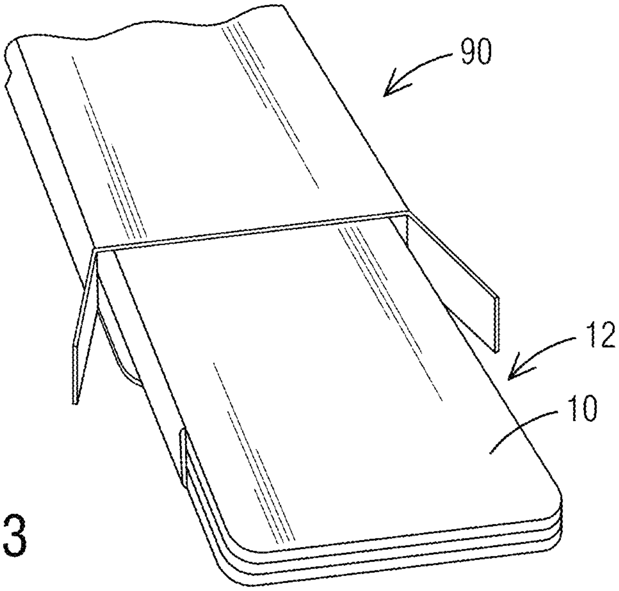
FIG. 3 is another perspective view of the coin mailer and display device of FIG. 1, showing the tri-fold body being removed from within the outer sleeve.
Figure 4:
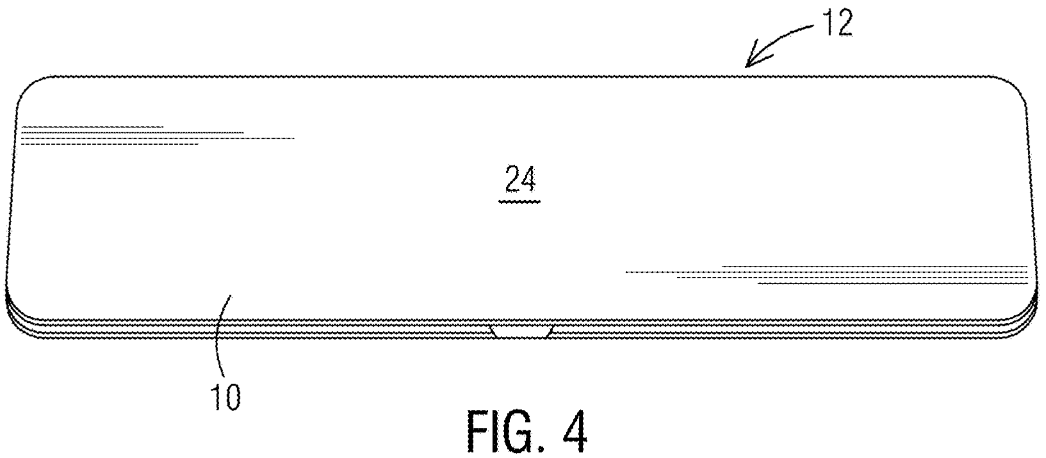
FIG. 4 is a backside view of the tri-fold body in the first mailer configuration.
Figure 5:
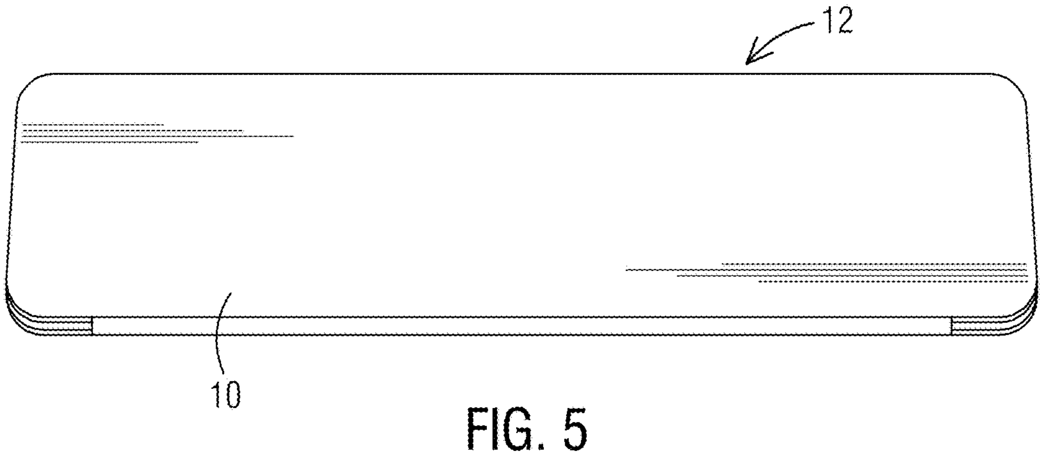
FIG. 5 is a frontside view of the tri-fold body in the first mailer configuration.
Figure 6:
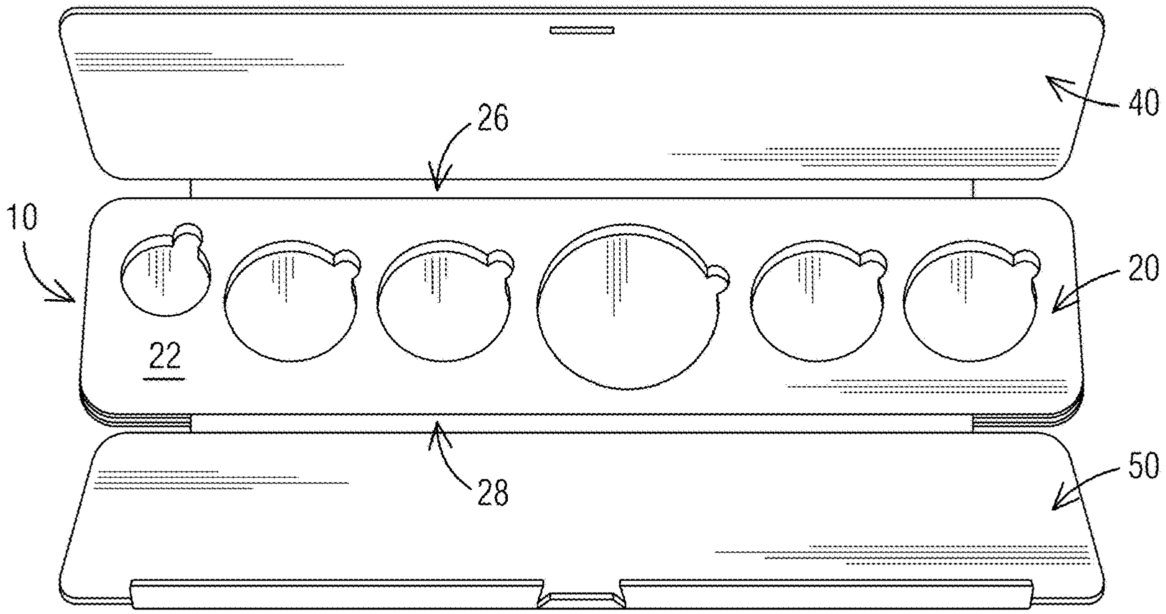
FIG. 6 is a top perspective view of the front of the tri-fold body in the process of being unfolded from the first mailer configuration.
Figure 7:
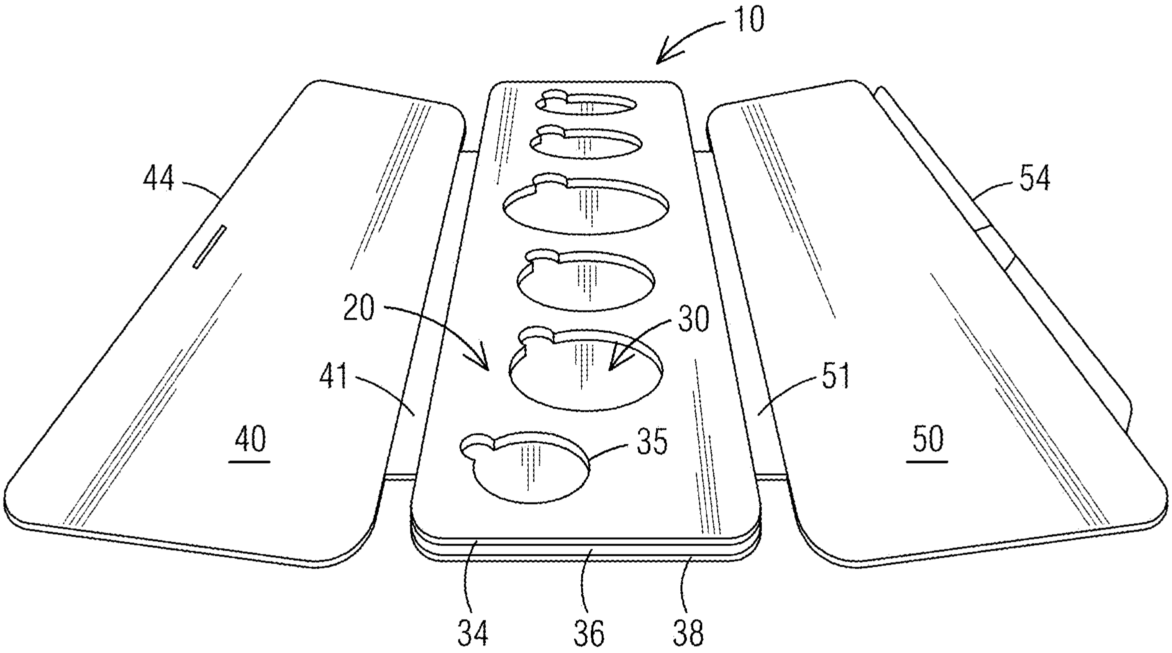
FIG. 7 is a side perspective view of the front of the tri-fold body in an intermediate flat configuration.
Figure 8:
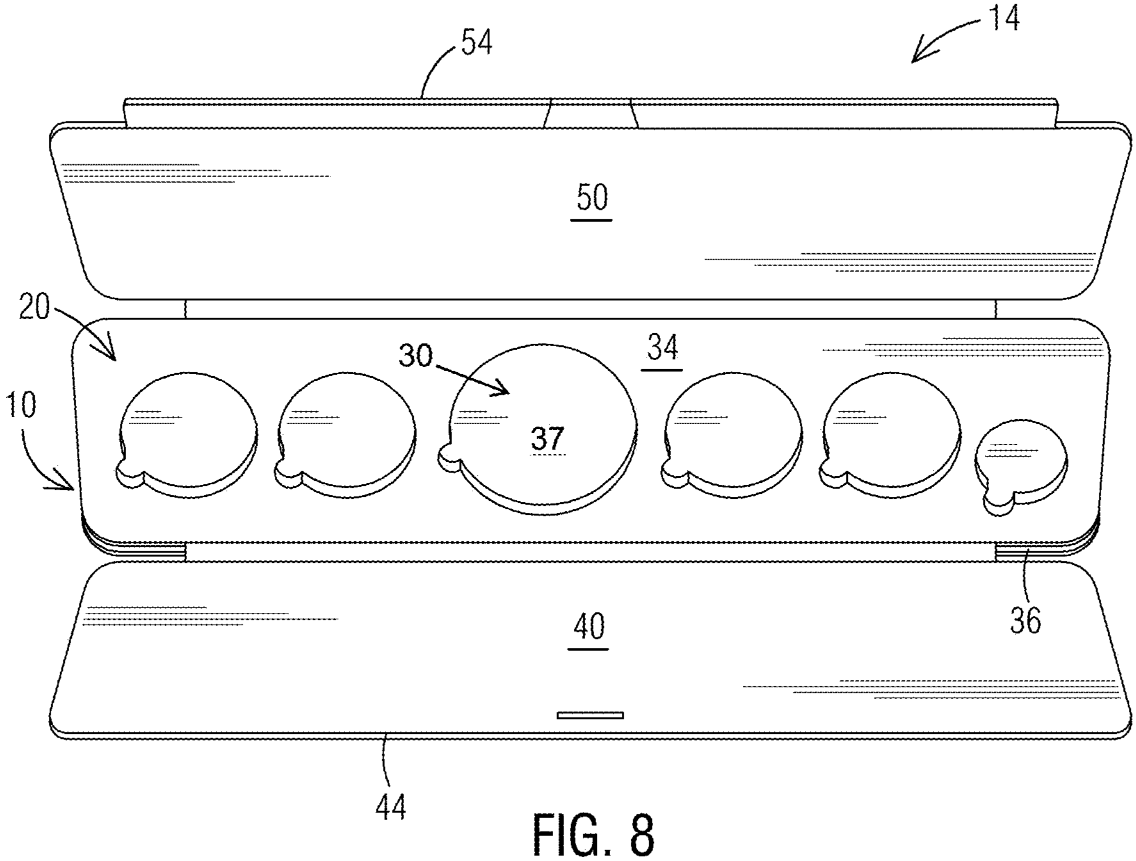
FIG. 8 is an upper edge perspective view of the front of the tri-fold body in the intermediate flat configuration of FIG. 7.
Figure 9:
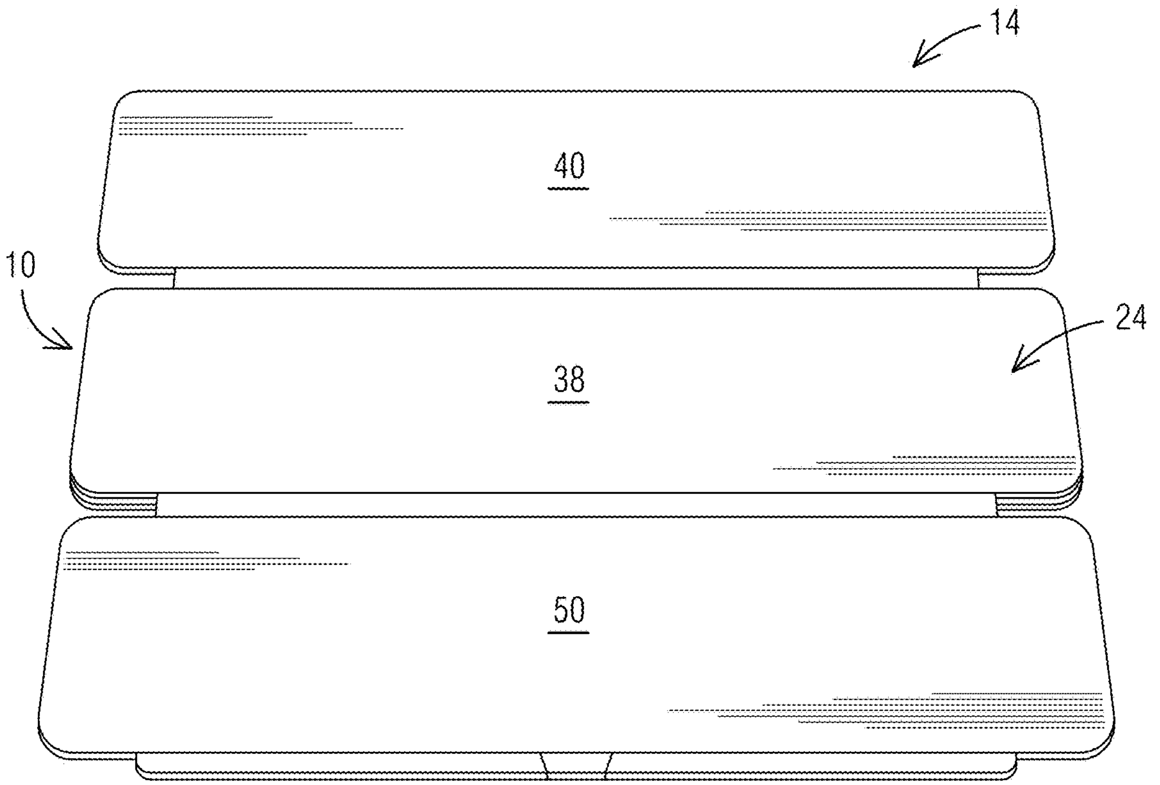
FIG. 9 is a top perspective view of the back of the tri-fold body in the intermediate flat configuration of FIG. 7.

As shown in the illustrated embodiment, the coin mailer and display device 10 in the inner mailer 12 can comprise a tri-fold body of separate panels in which the center panel 20 has a thickness sufficient to hold and secure the coins therein, between a front face 22 and a back face 24, and with an upper panel 40 and a lower panel 50 foldably coupled to and extending outwardly from the upper edge 26 and the lower edge 28 of the center panel 20. In one aspect of the present disclosure shown in FIGS. 6-9, the center panel 20 can further comprise a front layer 34 defining the front face or surface 22, a center layer 36 having a thickness that includes the depth of one or more pockets 30 sized and shaped to receive one or more coins or tokens 80, and a back layer 38 defining the back face or surface 24. In addition, for instance, the upper panel 40 and the lower panel 50 and the back layer 38 (or sheet) of the center panel 20 can be formed from a continuous sheet of paper having cutouts, fold lines, tabs, and slits formed therein that provide the conversion of the device 10 from the mailing configuration 12 to the display configuration 16. In other aspects the fold lines that connect the upper panel 40 and the lower panel 50 to the center panel 20 can comprise double-fold lines with a spacer strip 41, 51 separating the two folds that is substantially equal to the thickness of the center panel 20, thereby allowing for the upper panel 40 and the lower panel 50 to fold neatly over the top face 22 of the center panel 20 to form the folded state or mailer configuration 12 having a low-profile substantially rectangular shape in cross-section as viewed through the thickness or cross-section of the center panel 20, as shown in FIGS. 3-5.

To convert the device 10 from the mailer configuration 12 to a display configuration 16, the coin mailer and display device can first be folded open (FIG. 6) to a substantially flat and open intermediate configuration 14, as shown in FIGS. 7-10. The upper panel 40 and the lower panel 50 can then be folded back around behind the center panel 20, and then connected to each other using the tabs and slits (see FIGS. 15-18) formed near their respective outer edges 44, 54 to form the tubular triangular or pyramid-shaped display configuration 16. Other forms of connection along the outer edges 44, 54 of the upper panel 40 and the lower panel 50 are also possible and considered to fall within the scope of the present disclosure. Once the upper panel 40 and the lower panel 50 are connected together near or along their outer edges 44, 54, the device 10 may then be rotated so that the lower panel 50 forms a base surface, thereby positioning the center panel 20 in a forwardly and upwardly-facing display orientation, as shown in 10, 12, 14, and 19.

While the embodiment of the present disclosure shown in the drawings includes a tri-fold body, it is foreseen that the coin mailer and display device 10 may also include other types of multi-fold bodies, such as a bi-fold body or a four-fold body, that can be converted from a first mailer configuration to a second display configuration, are also possible and considered to fall within the scope of the present disclosure.

Figure 13:
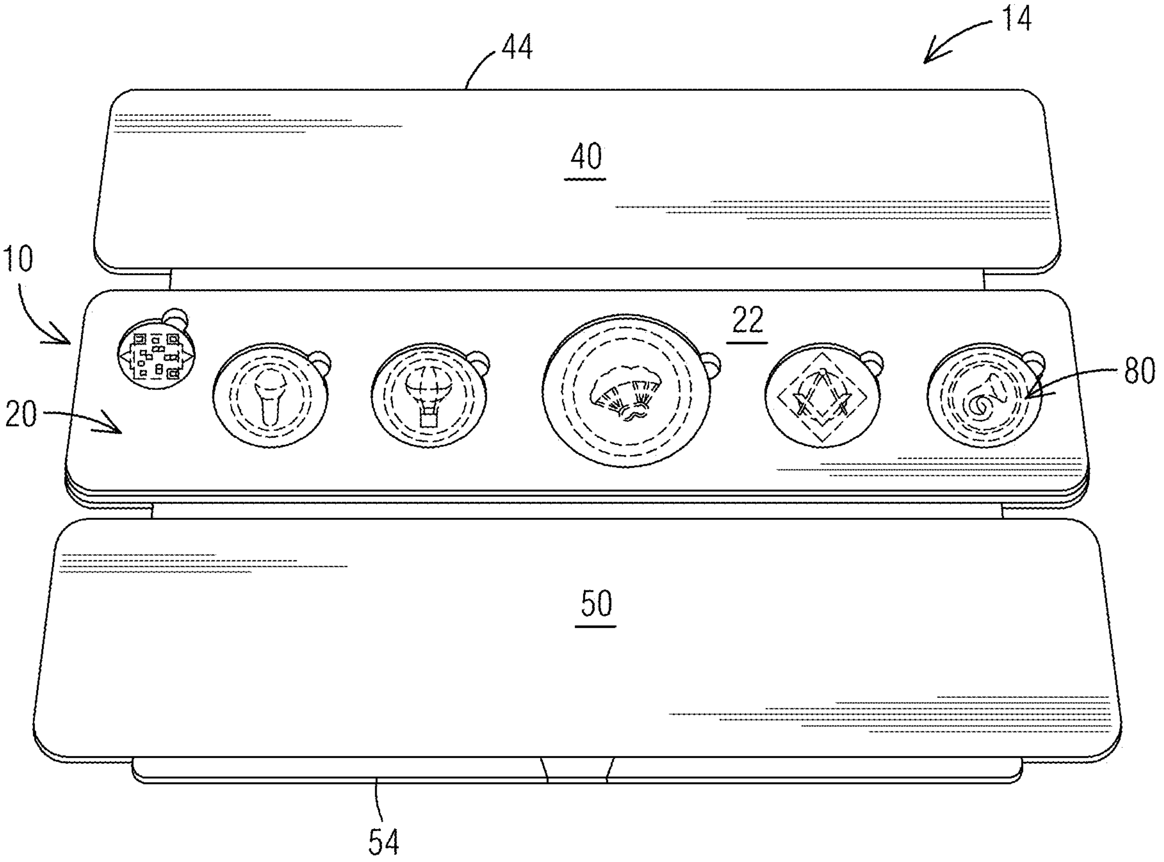
FIG. 13 is a top view of the front face of the tri-fold body in the intermediate flat configuration and having the perforated portions of the front layer removed to reveal the pockets formed into the thickness of the first panel, and with the coins or tokens positioned therein.
Figure 14:
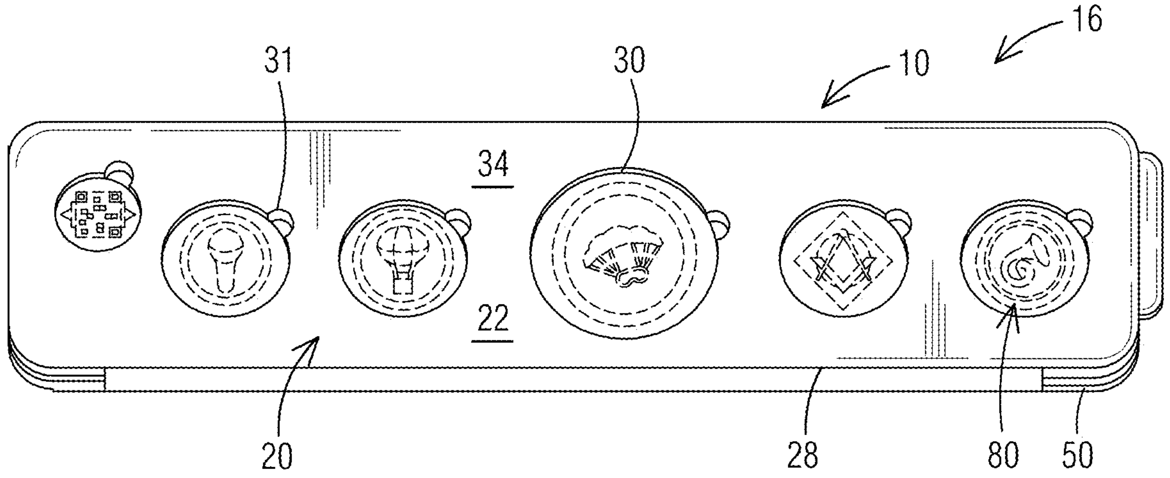
FIG. 14 is a front perspective view of the front face of the tri-fold body of FIG. 13 in the second display configuration.
Figure 15:
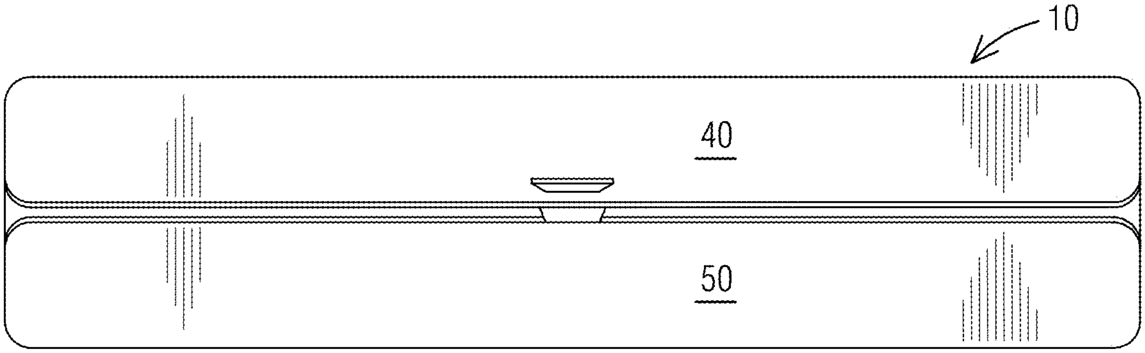
FIG. 15 is a top view of the back of the tri-fold body showing the connection between the second panel and the third panel, prior to positioning in the second display configuration.
Figure 16:
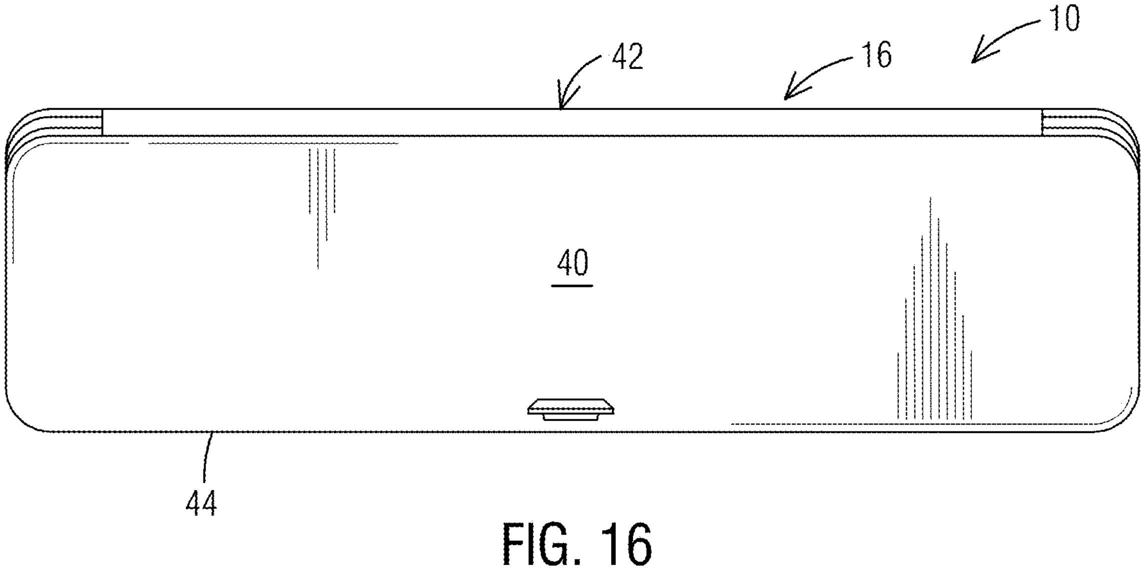
FIG. 16 is a backside perspective view of the second panel of the tri-fold body in the second display configuration.
Figure 17:
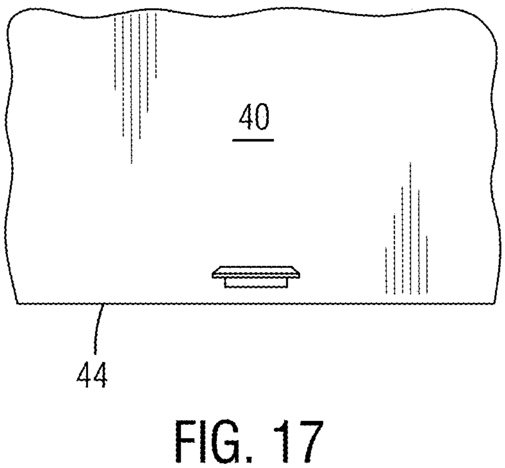
FIG. 17 is a close-up backside view of the tri-fold body in the second display configuration showing the second panel with the connection between the second panel and the third panel.
Figure 18:
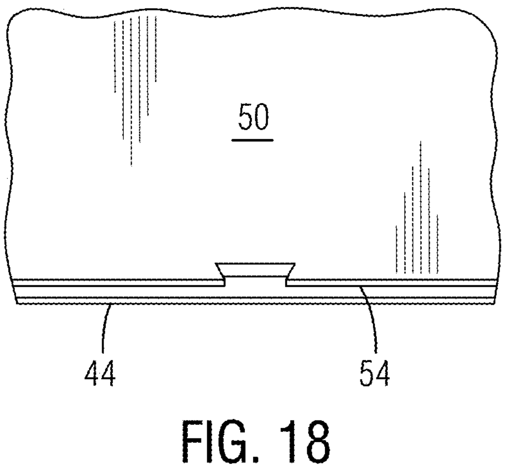
FIG. 18 is a close-up underside view of the tri-fold body in the second display configuration showing the third panel with the connection between the second panel and the third panel.
Figure 19:
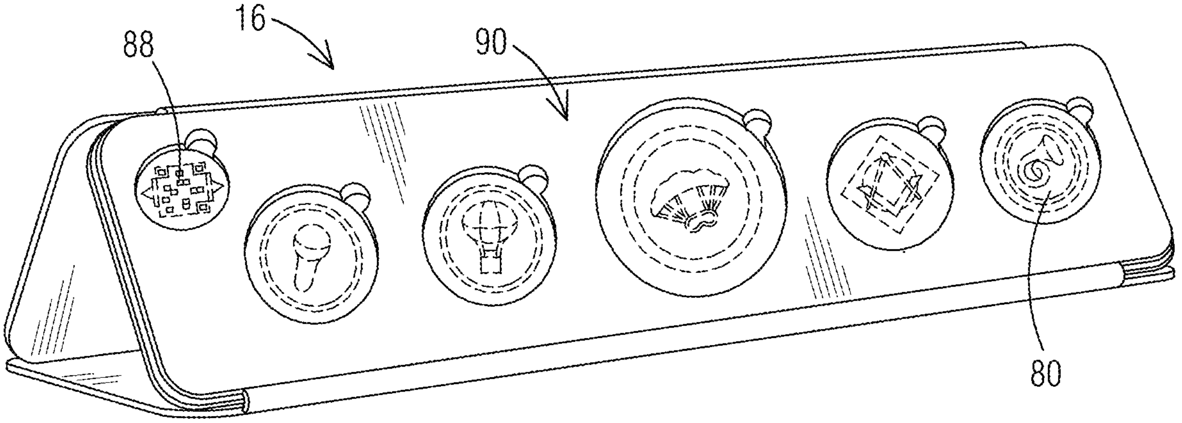
FIG. 19 is another front perspective view of the front face of the tri-fold body of FIG. 13 in the second display configuration.

With reference to FIGS. 13-14 and 19, the center panel 20 can have a thickness that allows for one or more pockets 30 to be formed therein, with each pocket 30 being sized and shaped to snuggly receive a coin or token 80 therein. As shown in the figures, the pockets 30 and coins 80 can be of different size, and their positions across the face of the center panel 20 can also be varied as desired. In one aspect the center panel 20 can comprise an elongate body having a width that is greater than its height, and with a plurality of pockets 30 extending across with the width of the elongate body and with each being configured to receive a specific coins or token. Each of the pockets 30 can further include a finger-tip cutout 31 that facilitates the engagement of the edge of a coin 80 contained therein by a user to lift and grasp the coin and remove it from the pocket.

The thickness of the center panel 20 can be greater than the thickness of the coins 80 contained therein to allow the front surfaces of the coins 82 to remain flush or below the front surface 22 of the center panel 20. For example, as described above and shown in FIGS. 3, 7, and 11, the center panel 20 can comprise a front layer 34 defining the front surface 22, a center layer 36 having a thickness that includes the depth of the pocket 30, and a back layer 38 defining the back face 24. In one aspect the pockets 30 can extend entirely through the thickness of the center layer 36, so that the inner surface of the back layer 38 of the first panel 20 defines the bottom surface 37 of the pocket 30 upon which the coin or token 80 is supported. In other aspects the pockets 30 may extend only partially into the thickness of the center layer 36, with the remainder of the thickness of the center layer defining the bottom surface of the pocket.

Figure 10:
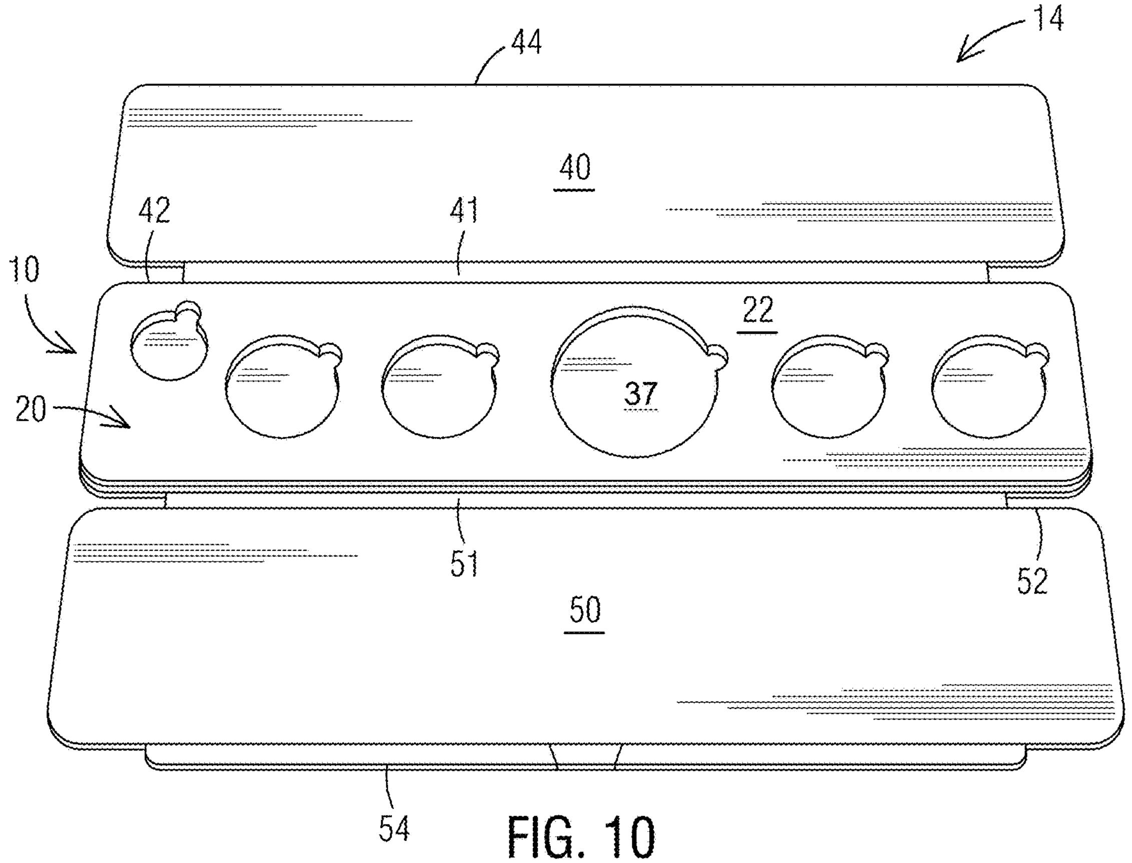
FIG. 10 is a top view of the front of the tri-fold body in the intermediate flat configuration of FIG. 7.
Figure 11:
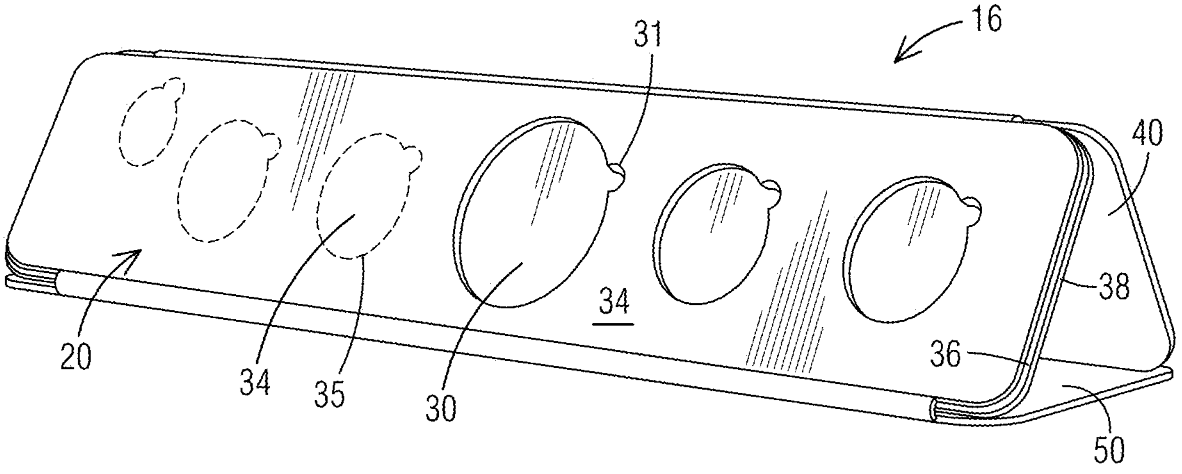
FIG. 11 is a side perspective view of the front face of the tri-fold body in the second display configuration.
Figure 12:
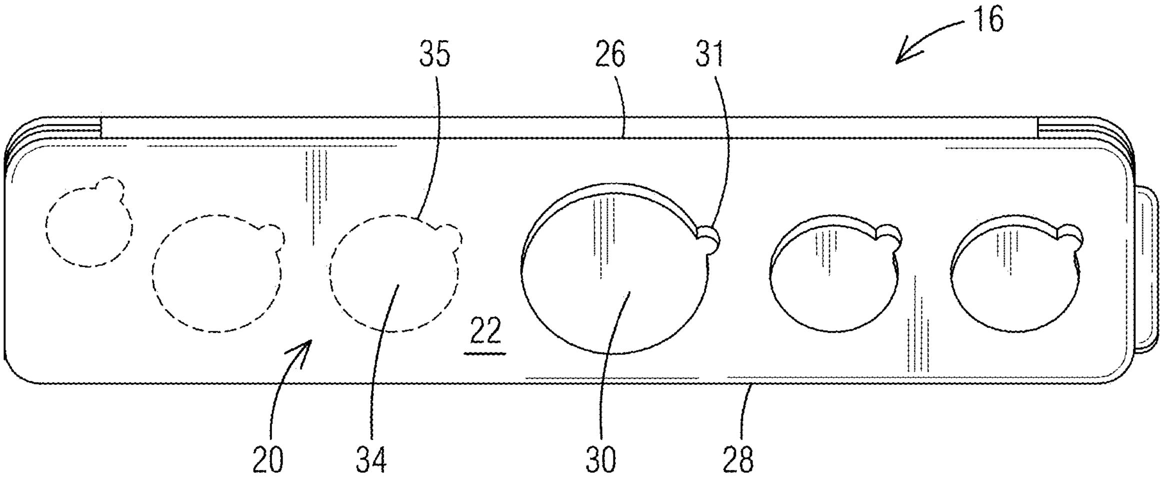
FIG. 12 is a front view of the front face of the tri-fold body in the second display configuration of FIG. 11.

With reference to FIGS. 10-12, the front layer 34 can also comprise a cover sheet that covers the coins or tokens 80 contained in the pockets 30 to initially keep them from view. In addition, perforated tear lines 35 can be formed into the cover sheet corresponding in size and shape and aligned with the border of the underlying pockets 30, so that individual sections of the cover sheet covering particular coins can be removed as desired or instructed. As shown in the drawings, the tear-out lines can include the finger-tip cutouts 31 as well.

Figure 20:
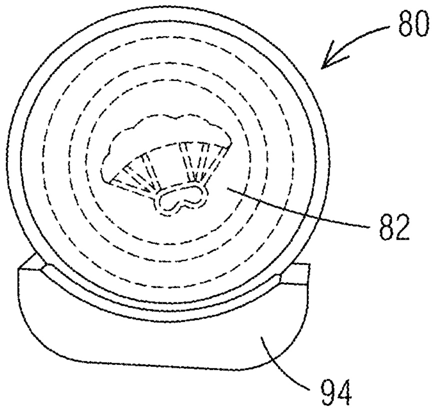
FIG. 20 is a frontside perspective view of one of the coins or tokens configured for shipping and display with the coin mailer and display device of FIG. 1 resting on a separate support base.
Figure 21:
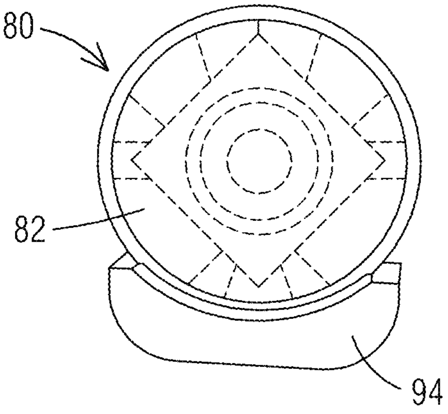
FIG. 21 is a backside perspective view of the coin or token and support base of FIG. 20.
Figure 22:
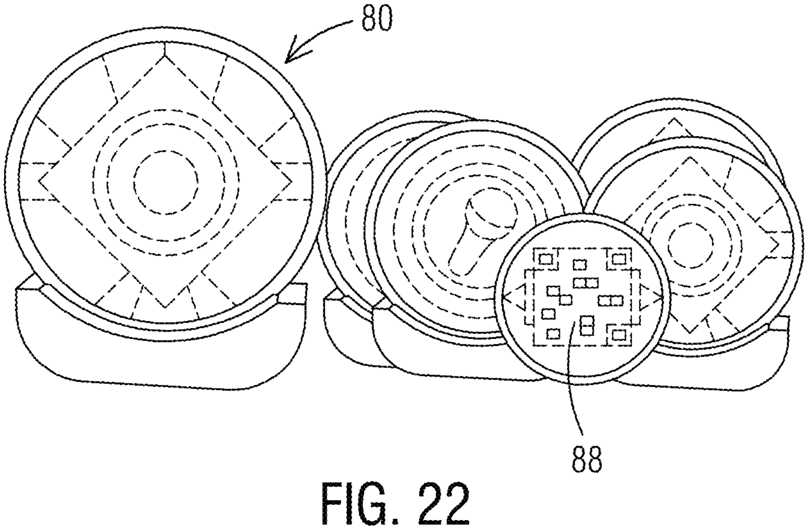
FIG. 22 is a front perspective view of a plurality of coins or tokens of different size and configured for shipping and display with the coin mailer and display device of FIG. 1.

It will be further appreciated that the coin mailer and display device 10 can be combined with the coins and tokens 80 contained therein to form a coin mailer and display system 90 that can be used by a wide variety of users in one of more achievement programs, including but not limited to a system that combines the physical tokens with an online digital achievements program. For example, as shown in FIGS. 19-22, the coins or tokens 80 can be created with engraved or embossed surface features to signify specific achievements and combined in groups to signify the completion of specific intermediate activities or goals that combined together signify the achievement of a larger goal. In one aspect the coins or tokens can include a QR (quick response) code 88 that can be scanned and linked with an online program or database, with completion of a specific task or activity or the accomplishment of a goal can provide permission for a user to access the coin or token contained in the coin mailer and display device 10, and then scan the previously-covered QR code 88 to formalize or publish the accomplishment of the task. As shown in FIGS. 20-21, each accessible coins or tokens 80 can also be separately displayed on an individual support base 92, and which support base 92 may also form a part of the coin mailer and display system 90.

As indicated above, the combination coin mailer and display device has been described herein in terms of preferred embodiments and methodologies considered by the inventor to represent the best mode of carrying out the invention. It will be understood by the skilled artisan, however, that a wide range of additions, deletions, and modifications, both subtle and gross, may be made to the illustrated and exemplary embodiments of the coin mailer and display device without departing from the spirit and scope of the present disclosure that is constrained only by the following claims.

What is claimed is:

1. A mailer and display device for shipping and displaying at least one coin or token, the mailer and display device comprising:

- a first panel having a front face, a back face opposite the front face, a thickness between the front face and the back face, an upper edge, and a lower edge opposite the upper edge, the first panel including at least one pocket extending inwardly from the front face having a border sized and shaped to closely receive an outer periphery of the at least one coin or token and a depth equal to or greater than a thickness of the at least one coin or token;
- a second panel having a lower edge foldably coupled to the upper edge of the first panel and an upper edge opposite the lower edge, and
- a third panel having an upper edge foldably coupled to the lower edge of the first panel and a lower edge opposite the upper edge,
- wherein in a first mailer configuration the second panel and the third panel are both configured to fold flat over the first panel to form a substantially rectangular shape in cross-section through the thickness of the first panel, and
- wherein in a second display configuration the second panel and the third panel are configured to fold behind the first panel, with the upper edge of the second panel in at least partial connection with the lower edge of the third panel, to form a hollow triangular shape in cross-section through the thickness of the first panel, with the third panel forming a base and the front face of the first panel facing forwardly and upwardly.

2. The mailer and display device of claim 1, wherein first panel further comprises a front layer defining the front face, a center layer having a thickness that includes the depth of the pocket, and a back layer defining the back face.

3. The mailer and display device of claim 2, wherein the second panel, the third panel, and the back layer of the first panel further comprise a single sheet of foldable material having a substantially constant thickness.

4. The mailer and display device of claim 3, wherein the foldable material is a paper-based material.

5. The mailer and display device of claim 3, wherein the each of the lower edge of the second panel and the upper edge of the third panel further comprises a spacer strip having a width substantially equal to the thickness of the first panel between the front face and the back face.

6. The mailer and display device of claim 2, wherein the front layer of the first panel further comprises a sheet of paper-based material.

7. The mailer and display device of claim 2, wherein the front layer of the first panel extends across the top of at least one pocket formed into the center layer and includes perforated tear lines corresponding to the border of the at least one pocket, the perforated tear lines being configured to allow for the removal of a portion of the front layer overlying the at least one pocket.

8. The mailer and display device of claim 7,

- wherein the at least one pocket further comprises a finger-tip cutout adjacent the border of the at least one pocket, and
- wherein the perforated tear lines of the front layer extend around a border of the finger-tip cutout.

9. The mailer and display device of claim 2,

- wherein the at least one pocket extends entirely through the thickness of the center layer, and
- wherein the back layer of the first panel defines a bottom surface of the pocket.

10. The mailer and display device of claim 2, wherein the at least one pocket extends partially into the thickness of the center layer with the remainder of the thickness of the center layer defining a bottom surface of the pocket.

11. The mailer and display device of claim 1,

- wherein first panel further comprises an elongate body having a width greater than a height, and
- wherein the at least one pocket further comprises a plurality of pockets extending across with the width of the elongate body and configured to receive a plurality of coins or tokens.

12. The mailer and display device of claim 1, wherein the second panel and the third panel are configured to fold over the front face of the first panel to form the substantially flat rectangular body in the first mailer configuration.

13. The mailer and display device of claim 1 and further comprising an outer sleeve having a rectangular tubular shape in cross-section through the thickness of the outer sleeve and configured to removably receive the mailer and display device in the first mailer configuration.

14. A mailer and display system comprising the mailer and display device of claim 13 and further comprising the at least one coin or token positioned in the at least one pocket in both the first mailer configuration and the display configuration.

15. The mailer and display system of claim 14, wherein the at least one coin or token includes engraved or embossed quick response code one of a front and back surface.

16. A method for converting a coin mailer and display device from a first mailer configuration for shipping at least one coin or token to a second display configuration for displaying the at least one coin or token, the coin mailer and display device having a tri-fold body with a first panel having a thickness with at least one pocket configured to receive the at least one coin or token, a second panel foldably coupled to an upper edge of the first panel and a third panel foldably coupled to a lower edge of the first panel, the second panel and the third panel both being folded flat over the first panel to position the tri-fold body in the first mailer configuration having a substantially rectangular shape in cross-section through the thickness of the first panel, with the tri-fold body being removably received within an outer sleeve, the method comprising:

removing the tri-fold body in the first mailer configuration from within the outer sleeve;

unfolding the second panel and the third panel from off the first panel to a substantially flat configuration;

folding the second panel and the third panel behind a back face of the first panel to form a hollow triangular shape in cross-section through the thickness of the first panel;

connecting an outer edge of the second panel with an outer edge of the third body; and positioning the tri-fold body in the second display configuration with the third panel forming a base and a front face of the first panel facing upwardly and outwardly.

17. The method of claim 16, further comprising pulling off a perforated portion of a front layer defining the front face of the first panel to expose the at least one pocket configured to receive the at least one coin or token.

* * * * *